United States Patent [19]

Maass et al.

[11] Patent Number: 5,021,735

[45] Date of Patent: Jun. 4, 1991

[54] OPTO-ELECTRONIC TACHOMETER AND POSITION DETECTOR OF AN ELECTRIC MOTOR

[75] Inventors: Jürgen Maass, Wiesloch; Helmut Meyer, Weinheim, both of Fed. Rep. of Germany

[73] Assignee: Heidelberger Druckmaschinen AG, Heidelberg, Fed. Rep. of Germany

[21] Appl. No.: 463,239

[22] Filed: Jan. 10, 1990

[30] Foreign Application Priority Data

Jan. 10, 1989 [DE] Fed. Rep. of Germany ....... 3900464

[51] Int. Cl.$^5$ .......................... G01P 3/36; G05B 1/06; G01D 5/34
[52] U.S. Cl. .................................. 324/175; 318/640; 250/231.18
[58] Field of Search .................. 324/175; 250/231.14, 250/231.18; 341/13; 318/640, 463

[56] References Cited

U.S. PATENT DOCUMENTS 4,228,396 10/1980 Palombo et al. .................... 318/254
4,866,268 9/1989 Tang et al. ...................... 250/231.18

Primary Examiner—Walter E. Snow
Attorney, Agent, or Firm—Herbert L. Lerner; Laurence A. Greenberg

[57] ABSTRACT

A device for determining the rotational speed and position of a rotor of an electric motor having at least one signal track arranged on the rotor includes at least one sensor located at a stator-side of the electric motor for scanning the signal track, and an evaluation circuit connected to the sensor, the sensor being sensitive to given stimuli of the signal track for alternatively adopting one of three different states which individually produce levels of different magnitude; the evaluation circuit including detectors responsive in accordance with the levels, for cutting off levels of given magnitude so that a recognition of the rotor position is derivable from a first and a second one of the three states, and the rotational speed is derivable from the third one of the three states.

17 Claims, 6 Drawing Sheets

OPTO-ELECTRONIC TACHOMETER AND POSITION DETECTOR OF AN ELECTRIC MOTOR

The invention relates to a device for determining rotational speed and position of a rotor, more particularly, of an electric motor, the device including at least one signal track arranged on the rotor, and scanned by at least one sensor located at a stator-side of the electric motor, and an evaluation circuit connected to the sensor.

A device of this general type has become known heretofore from German Published Non-Prosecuted Application (DE-OS) 34 18 153. The rotor of this heretofore known motor has a ring-shaped, magnetizable layer on a peripheral surface thereof which is read by a magnetic head. Information from the magnetic head is fed to an evaluation circuit in order to determine the rotational speed. The content of the information originating from the sensor of this known device is limited.

It is accordingly an object of the invention to provide a device of the aforementioned general type which, while of relatively simple construction, nevertheless, delivers a great amount of information regarding the operational state or condition of the electric motor. In particular, recognition of the position of the rotor, preferably for communication purposes and a determination of the rotational speed of the rotor in a relatively simple manner should be possible.

With the foregoing and other objects in view, there is provided, in accordance with the invention, a device for determining the rotational speed and position of a rotor of an electric motor having at least one signal track arranged on the rotor, comprising at least one sensor located at a stator-side of the electric motor for scanning the signal track, and an evaluation circuit connected to the sensor, the sensor being sensitive to given stimuli of the signal track for alternatively adopting one of three different states which individually produce levels of different magnitude; the evaluation circuit including detectors responsive in accordance with the levels, for cutting off levels of given magnitude so that a recognition of the rotor position is derivable from a first and a second one of the three states, and the rotational speed is derivable from the third one of the three states. Due to the formation of the signal track according to the invention in a manner that it can produce the three foregoing states, information of differing content can be obtained with regard to the operational state of the electric motor. The signal track need be scanned by only one sensor, however, so that only a small number of components have to be used. In order to be able to separate different information, a cut-off or screening technique is proposed in accordance with the invention; this technique is realized by means of detectors responsive in accordance with or in dependence upon the levels. The signals originating from the sensor and which are previously processed, if necessary or desirable, are sorted or separated by the detectors with respect to their levels, two of the states permitting recognition of the position of the rotor, and the third state serving to determine the rotational speed of the rotor. In this regard, various alternative possibilities may be introduced for transmitting or transferring the information of which light transmission is particularly suitable; however, devices which function electrically, or indeed magnetically, may also be used. It is also conceivable to effect a transmission of information by means of proximity switches which, in turn, could function either inductively or capacitively. The system according to the invention also permits the realization of the operating states of the motor by means of one and the same arrangement, that is, without the use of additional components. Control of the commutation of the electric motor may be effected, in particular, through use of the recognition of the position of the rotor, a tacho-signal being thereby also available for determining the rotational speed of the rotor.

In accordance with another feature of the invention, the detectors are electrical devices, and the levels are electrical voltage levels. It is thereby possible to use electronic circuits for evaluating information.

The device may be constructed so that the rotor is scanned by optical means. In accordance with a further feature of the invention, therefore, the signal track has light-reflecting zones of varying strengths, and the sensor is formed of a photoelectric component.

In accordance with an additional feature of the invention, the signal-track zones include first zones having a very strong light reflectivity and light-absorbing second zones having minimum reflectivity, and third zones having light reflectivity of medium strength, the three states being producible by the first, second and third zones.

To provide a compact structure in spite of a large amount of information, in accordance with an added feature of the invention, the zones for producing the third state are located within at least one of the other zones.

In accordance with yet another feature of the invention, the third zones having light reflectivity of medium-strength are arranged within the light-absorbing second zones.

To determine the rotational speed of the rotor in particular, in accordance with yet a further feature of the invention, the zones associated with one of the states are formed of like-sized sections spaced equidistantly from one another in a row extending around the rotor. This row or consecutive series of sections may be staggered in relation to the signal tracks.

In accordance with yet an additional feature of the invention, there is provided at least another signal track arranged on the rotor and at least another sensor at the stator-side of the motor, each of the sensors, respectively, being associated with one of the signal tracks. Preferably three signal tracks are provided in the device according to the invention.

In accordance with yet an added feature of the invention, each of the signal tracks has light-reflecting zones of varying strengths, and the sensors are formed of photoelectric components.

In accordance with also another feature of the invention, the zones formed of like-sized sections constitute the zones having light reflectivity of medium strength.

In accordance with also a further feature of the invention, there are provided means responsive to the third zones for generating a tacho-signal formed of voltage pulses representing a measurement of the rotational speed of the rotor. In particular, the voltage pulses may take the form of rectangular pulses, the number of pulses per unit time varying with the rotational speed, so that by pulse counting, a conclusion regarding the rotational speed may be made.

In accordance with also an additional feature of the invention, there are provided means responsive to the first zones for producing a maximum voltage, to the second zones for producing a minimum voltage, and to the third zones for producing an intermediate voltage at the sensor. Thus, three voltages of different levels are used, each of which carries a different information content. In accordance with also an added feature of the invention, the minimum voltage producible in response to the second zones is approximately 0 volts.

For controlling the commutation of the motor, in accordance with another feature of the invention, the electric motor has a given pole pitch, and the zones for producing the first and second states from which the recognition of the rotor position is derivable are disposed in succession around the rotor in correspondence with the pole pitch of the electric motor. The physical construction of a commutation arrangement of this type is generally known, and does not need to be described in greater detail. Preferably, control circuits equipped with thyristors are employed.

In accordance with a further feature of the invention, the detectors have means for evaluating the voltage levels from a first threshold value located between the intermediate voltage and the maximum voltage, and a second threshold value lying between the minimum voltage and the intermediate voltage. Only those signals which lie above the first and above the second threshold value, respectively, are taken into account. Because the different zones produce different states which are differentiated by the levels of the voltages, separation of the signals is accordingly effected by means of the threshold values.

In accordance with an additional feature of the invention, there are provided means forming communication signals from the voltage pulses of the sensor which are greater than the first threshold value, and for forming tacho-signals from the voltage pulses of the sensor which are greater than the second threshold value but smaller than the first threshold value.

In accordance with an added feature of the invention, the rotor is formed with front and rear end faces, and the signal track is disposed on one of the end faces. If, three signal tracks, for example, are used, they can be formed as rings disposed concentrically to or coaxially with the axis of rotation of the motor. In this regard, the rings have varying diameters, and one sensor is assigned to each ring.

In accordance with a concomitant feature of the invention, the electric motor is a brushless direct-current motor.

Other features which are considered as characteristic for the invention are set forth in the appended claims.

Although the invention is illustrated and described herein as embodied in a device for determining the rotational speed and position of a rotor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
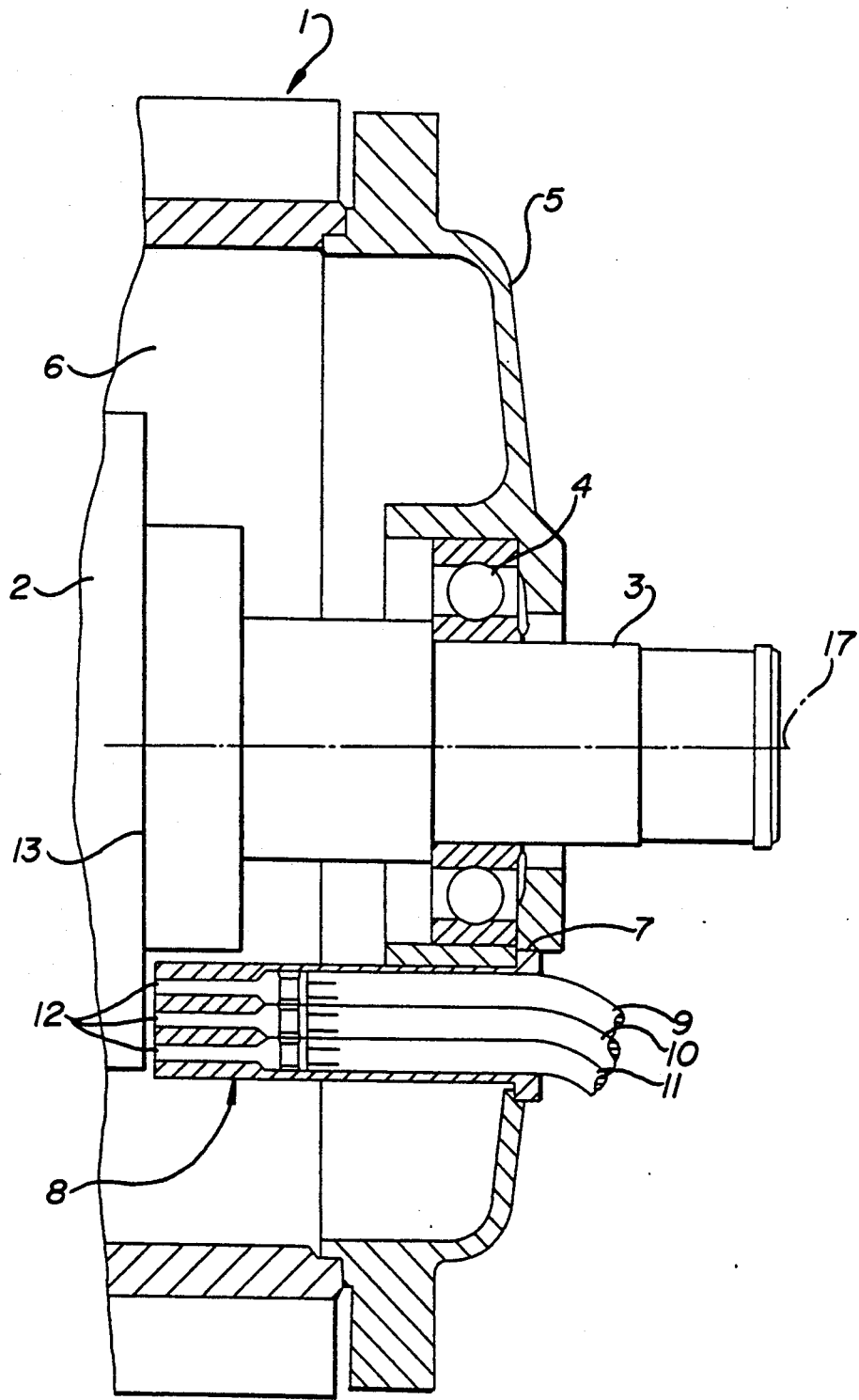
FIG. 1 is a fragmentary longitudinal sectional view of an electric motor equipped with a device for determining the rotor position and rotational speed of an electric motor in accordance with the invention.

Referring now to the drawing and, first, particularly to FIG. 1 thereof, there is shown therein a partial sectional view of a motor 1. The motor 1 has a rotor 2, with a shaft 3 supported by means of ball bearings 4 in a motor housing 5. Located within the motor housing 5 are coils 6 on a stator side of the motor 1.

The housing 5 is provided with a recess 7, into which an optical unit 8 is inserted. The optical unit 8 has three light conductor strands or cords of optical fibers 9, 10 and 11, each optical fiber strand 9, 10, 11 being formed of one outgoing and one returning light conductor. End surfaces 12 of the optical fiber cords 9, 10 and 11 are located opposite an end face of the rotor 13, at a slight distance therefrom.

Figure 2:
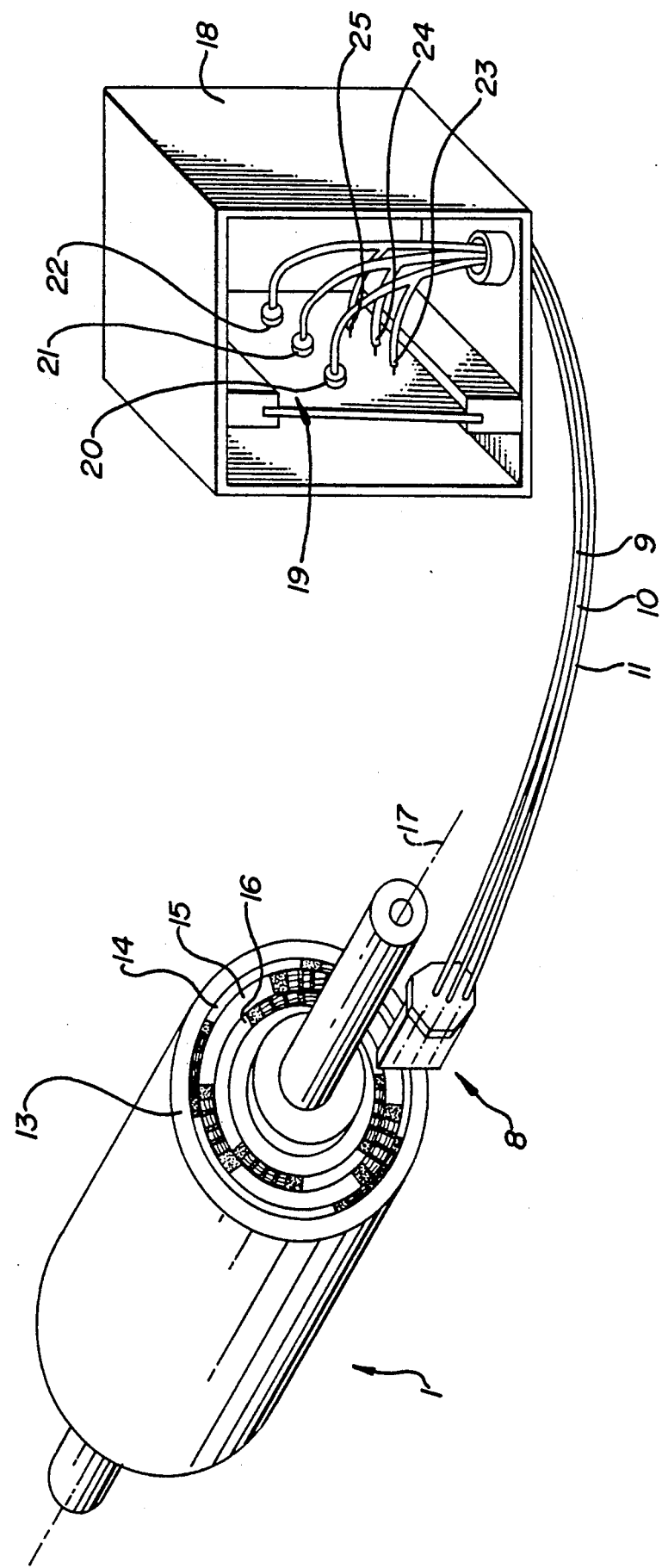
FIG. 2 is a diagrammatic perspective view of the rotor of the electric motor of FIG. 1 in an assembly for optically scanning the face of the rotor which has signal tracks thereon.

It is apparent from FIG. 2 that the end face of the rotor 13 has three different signal tracks 14, 15 and 16, which are formed of respective rings disposed concentrically to or coaxially with a central axis 17 of the shaft 3.

The light conductor strands 9, 10 and 11 extend to a housing 18, in which an evaluation circuit 19 is accommodated on a printed circuit board or card, which is otherwise not shown in detail in FIG. 2. In the thus illustrated assembly, the outgoing conductors of the optical fiber cords 9, 10 and 11 are connected to light signal transmitters or transducers. 20, 21 and 22, and ends 23, 24 and 25 of the returning conductors lead to sensors 26, 27 and 28 (FIG. 5) which are located in the optical unit 8 (FIG. 2). According to FIG. 5, the sensors 26, 27 and 28 are in the form of photoelectric components, namely photoelectric diodes 29, 30 and 31.

During operation, the light produced by the light signal transmitters 20, 21 and 22 is conducted via the outgoing conductors of the optical fiber cords 9, 10 and 11 to the end surfaces 12 at which, as the light emerges, it impinges on the signal tracks 14, 15 and 16. The light which is then reflected by the signal tracks 14, 15 and 16 strikes the end surfaces 12 of the return conductors of the optical fiber cords 9, 10 and 11, and is conducted to the photoelectric diodes 29, 30 and 31. The end portions 23, 24 and 25 of the return conductors are shown diagrammatically in FIG. 5 as bars.

Figure 3:
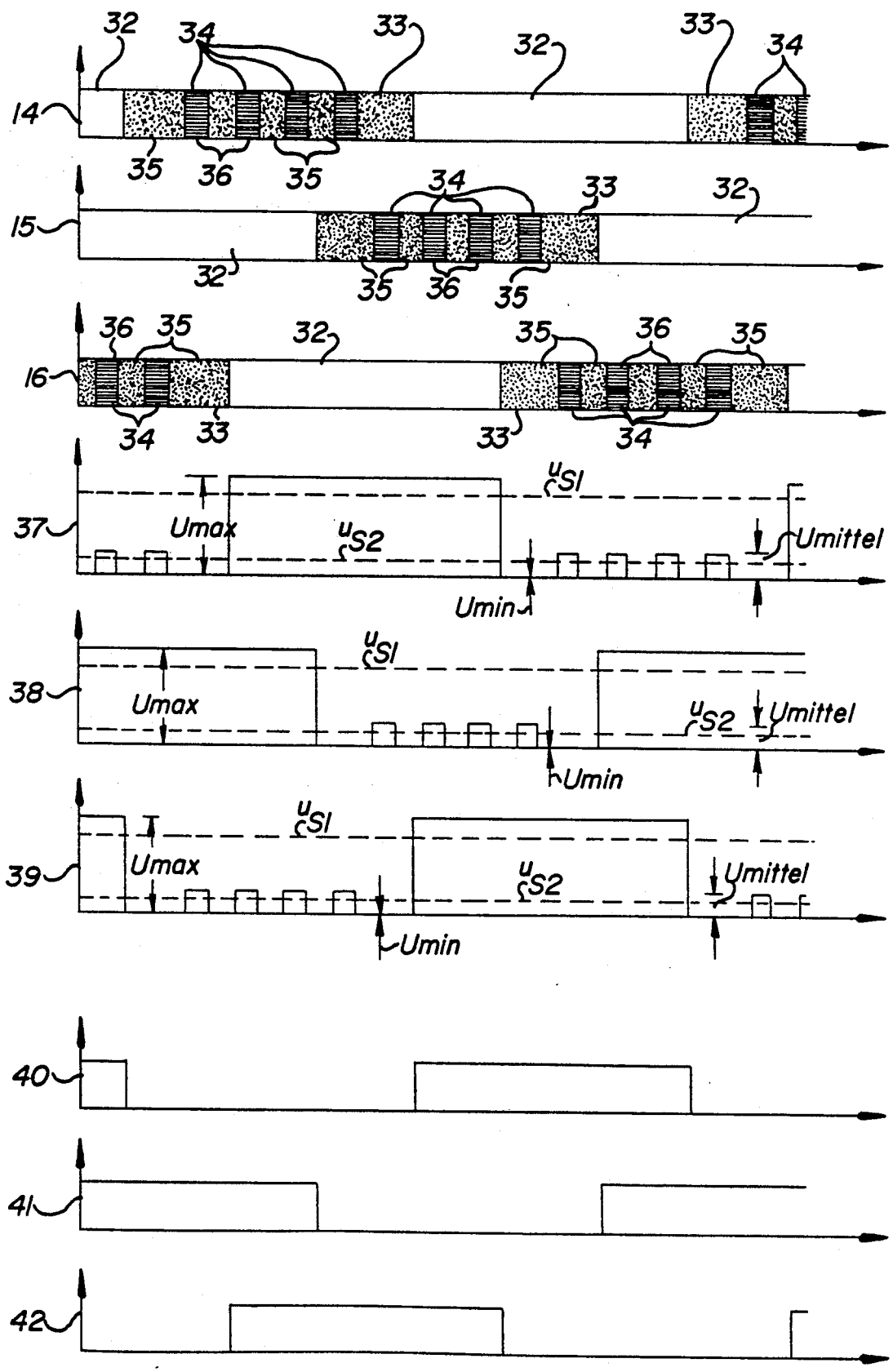
FIG. 3 is a series of plot diagrams of three signal tracks and of voltage curves or waveforms related to the signal tracks, as detected by optical sensors.
Figure 4:
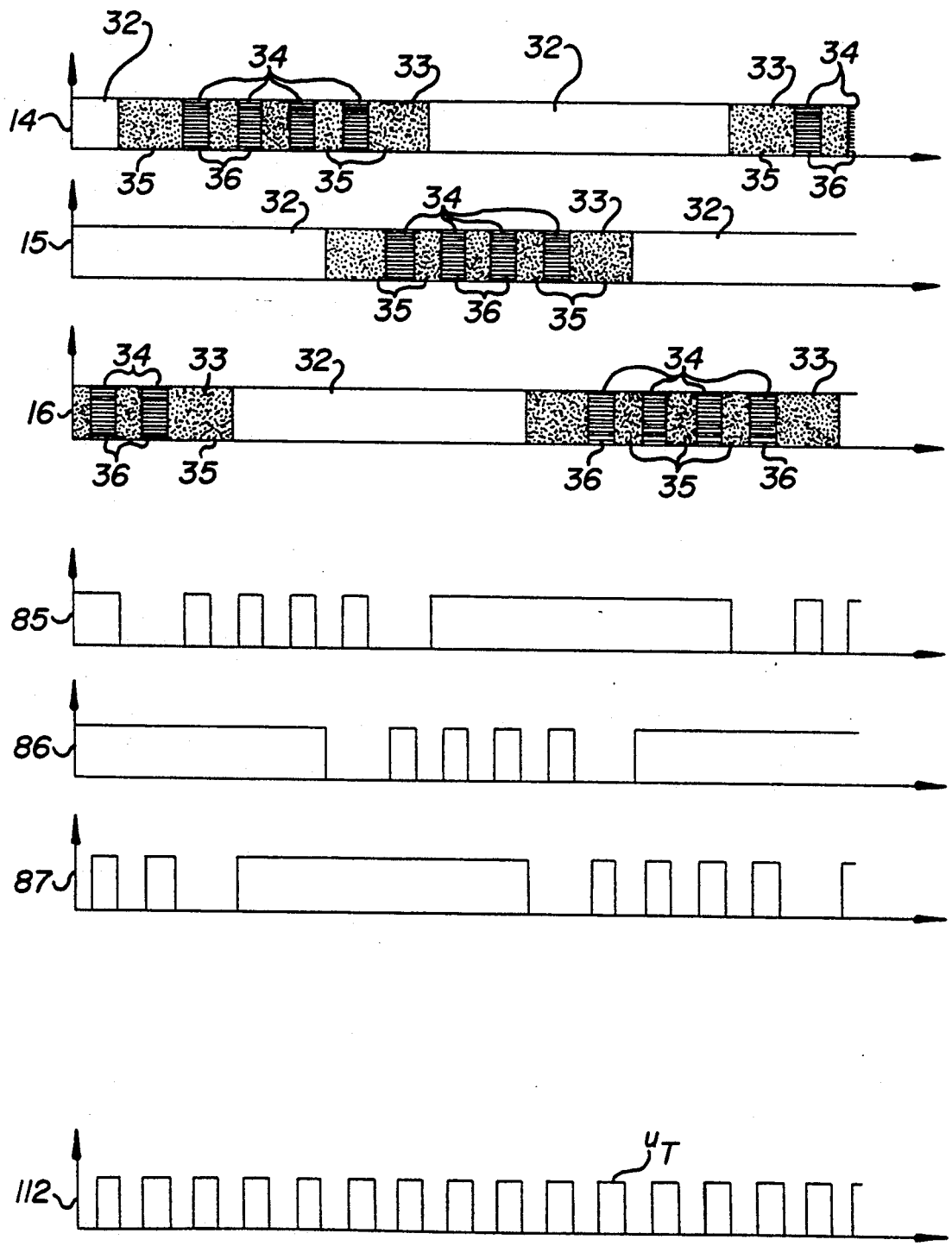
FIG. 4 is a repeated view of the plot diagrams of the three signal tracks with other voltage curves or waveforms related to the signal tracks and offering different information.

As is generally indicated in FIG. 2, the signal tracks 14, 15 and 16 have different zones 32, 33 and 34 (note FIGS. 3 and 4). In practice, first zones 32 are provided with a surface having a strong (especially, specular) light reflection capability and second, light-absorbing zones 33, formed, in particular, of dark areas. Third zones 34 are also provided which produce a medium-strength light reflection. This may be accomplished, for example, by providing a specular or reflective surface with a dot raster or screen, which is formed of dark-colored and, especially, black dots. Obviously, the second zone 33 may be formed of a dull or mat black, while the third zone 34 is formed of a gray tint. On the other hand, the first zone 32 could be of white tint, or also a metallic specular or reflective surface.

The arrangement of the zones 32, 33 and 34 is in accordance with the pole pitch of the electric motor 1, i.e., each signal track 14, 15, 16 has alternating second zones 33 and first zones 32 which, with regard to the three signal tracks 14, 15 and 16, are staggered or offset from one another.

It is contemplated, especially, that the third zones 34 be located within the second zones 33. A non-reflecting section 35 is thus adjoined by a medium-strength reflecting section 36, which is again followed by a non-reflecting section 35, and so forth. Altogether, within a second zone 33 located between two first zones 32, four sections 36 are provided which have a medium-strength reflectivity or reflection capability. Then, one third zone 34, which is formed of four sections 36, is located within one second zone 33 which is formed of five sections 35.

FIGS. 3 and 4 show different voltage diagrams which are assigned to the individual signal tracks 14, 15 and 16. Thus, according to FIG. 3, a plot diagram 37 results from the signal track 16, a plot diagram 38 from the signal track 15 and a plot diagram 39 from the signal track 14; moreover, a plot diagram 40 results from the plot diagram 39, a plot diagram 41 from the plot diagram 38, and a plot diagram 42 from the plot diagram 37 (as is explained hereinafter in greater detail).

It is further apparent from FIG. 3 that the first zones 32 with strong light reflection feed a correspondingly strong light to the appertaining photoelectric diode 29, 30 and 31, respectively, so that a voltage pulse results corresponding to the length of the first zone 32 of strong light reflection, and having an amplitude which corresponds to a maximum voltage Umax. The third zones 34, with a light reflection of medium strength, result in voltage pulses having amplitudes characterized by an intermediate voltage Umid. The second zones 33, which have a light-absorbing effect, i.e. minimum reflectivity, result in the light which is fed to them being virtually unreflected, that is, the photoelectric diodes 29, 30 and 31, respectively, associated therewith receiving virtually no signal, so that the minimum voltage Umin results; in the embodiment of the instant application, this is 0 volts, that is, Umin is located on the abscissa of the plot diagrams in every case.

Figure 5:
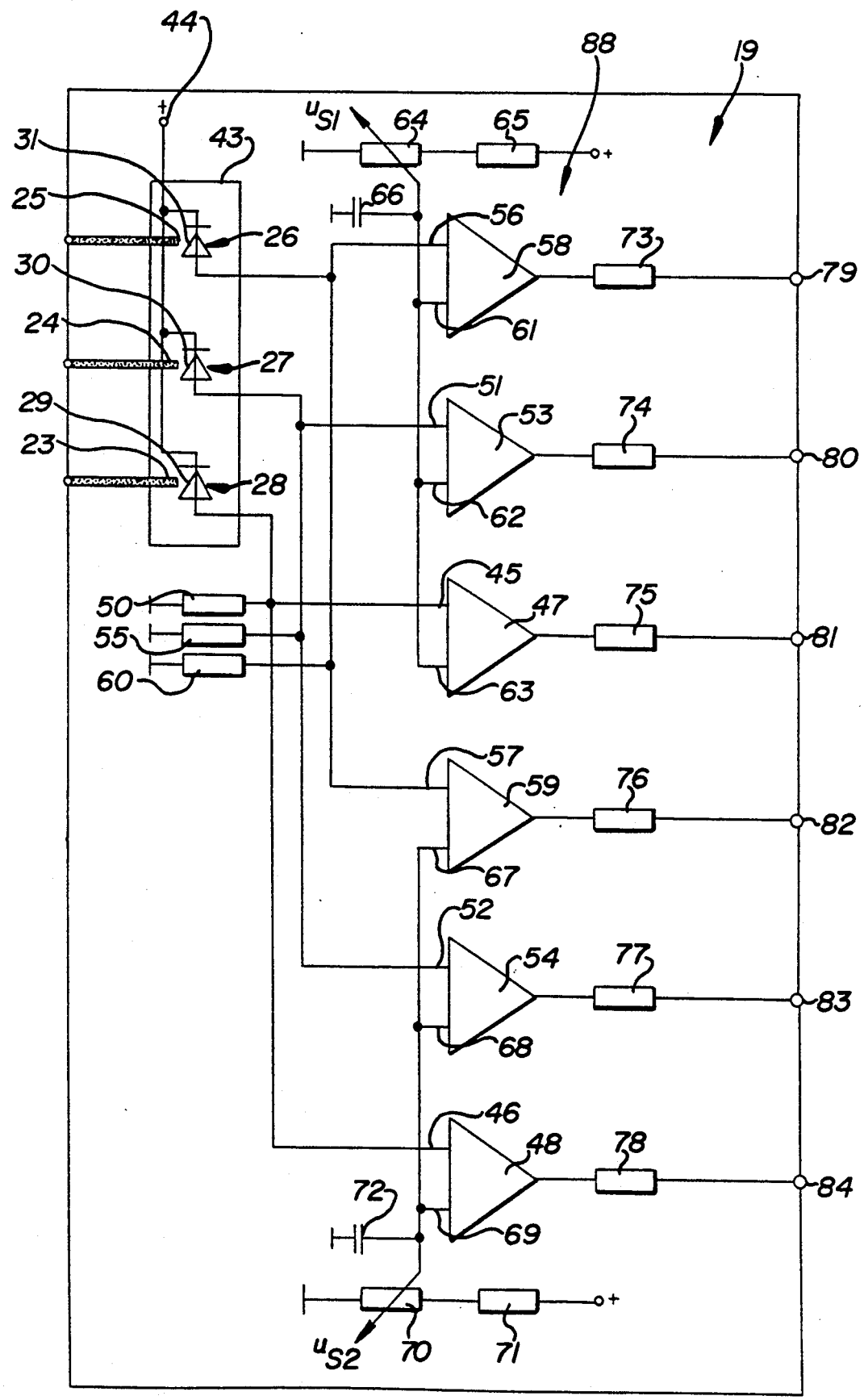
FIG. 5 is a circuit diagram for an evaluation circuit forming part of the device according to the invention.

For a further understanding of the invention, the circuit of FIG. 5 is explained hereinafter. The photoelectric diodes 29, 30 and 31 are located on a special mounting or holder 43. They have cathodes which are connected to a terminal 44 of a positive pole of a non-illustrated line voltage source or other power supply. The cathode of the photoelectric diode 29 leads to input terminals 45 and 46 of respective comparators 47 and 48, and is additionally connected to ground via a resistance 50. The cathode of the photoelectric diode 30 leads to input terminals 51 and 52 of respective comparators 53 and 54, and is also connected to ground via a resistance 55. The cathode of the photoelectric diode 31 leads to input terminals 56 and 57 of respective comparators 58 and 59, and is connected to ground via a resistance 60. Comparison inputs 61, 62 and 63 of the comparators 58, 53 and 47, respectively, lead to a slider of a potentiometer 64, which has a resistance arrangement connected to ground on one side, and connected via a resistance 65 to the positive pole of the line voltage source on the other side thereof. Furthermore, the slider of the potentiometer is connected to ground via a capacitor 66. Comparison inputs 67, 68 and 69 of the comparators 59, 54 and 48, respectively, are connected to a slider of a potentiometer 70 which has a resistance arrangement connected on one side to ground and, on the other side thereof, via a resistance 71, to the positive pole of the line voltage source. A grounded capacitor 72 is also provided, which is connected to the slider of the potentiometer 70. The outputs of the comparators 58, 53, 47, 59, 54 and 48 are connected via respective resistances 73, 74, 75, 76, 77 and 78 to respective terminals 79, 80, 81, 82, 83 and 84.

The device according to the invention is constructed so that a first threshold value $u_{S1}$ and a second threshold value $u_{S2}$, respectively, are set at the potentiometers 64 and 70. The relative amounts of these threshold values are apparent from FIG. 3 in the plot diagrams 37, 38 and 39. In this regard, the first threshold value $u_{S1}$ lies between the intermediate or middle voltage Umid and the maximum voltage Umax. The second threshold value $u_{S2}$ lies between the minimum voltage Umin and the intermediate voltage Umid.

The voltage waveforms or curves apparent from the plot diagrams 37 to 39, which are applied by the photoelectric diodes 29, 30 and 31 to the terminals 56, 51, 45, 57, 52 and 46 of the respective comparators 58, 53, 47, 59, 54 and 48, are compared with the first threshold value $u_{S1}$, which is present at the comparison inputs 61, 62 and 63. Voltage waveforms or curves in accordance with the plot diagrams 40, 41 and 42 of FIG. 3 thereby result at the terminals 79, 80 and 81, respectively.

The foregoing applies, as well, to the terminals 82, 83 and 84, however, in this regard, the comparators 59, 54 and 48 effect a comparison of the voltage waveforms or curves according to the plot diagrams 37, 38 and 39, respectively, with the second threshold value $u_{S2}$. This leads to voltage waveforms or curves according to the plot diagrams 85, 86 and 87 of FIG. 4. It can thus be said that the comparators 58, 53, 47, 59, 54 and 48, together with their wiring, represent detectors 88 which perform an evaluation of the sensors 26, 27 and 28 which are influenced by the first, second and third zones 32, 33 and 34 of the respective signal tracks 14, 15 and 16.

Figure 6:
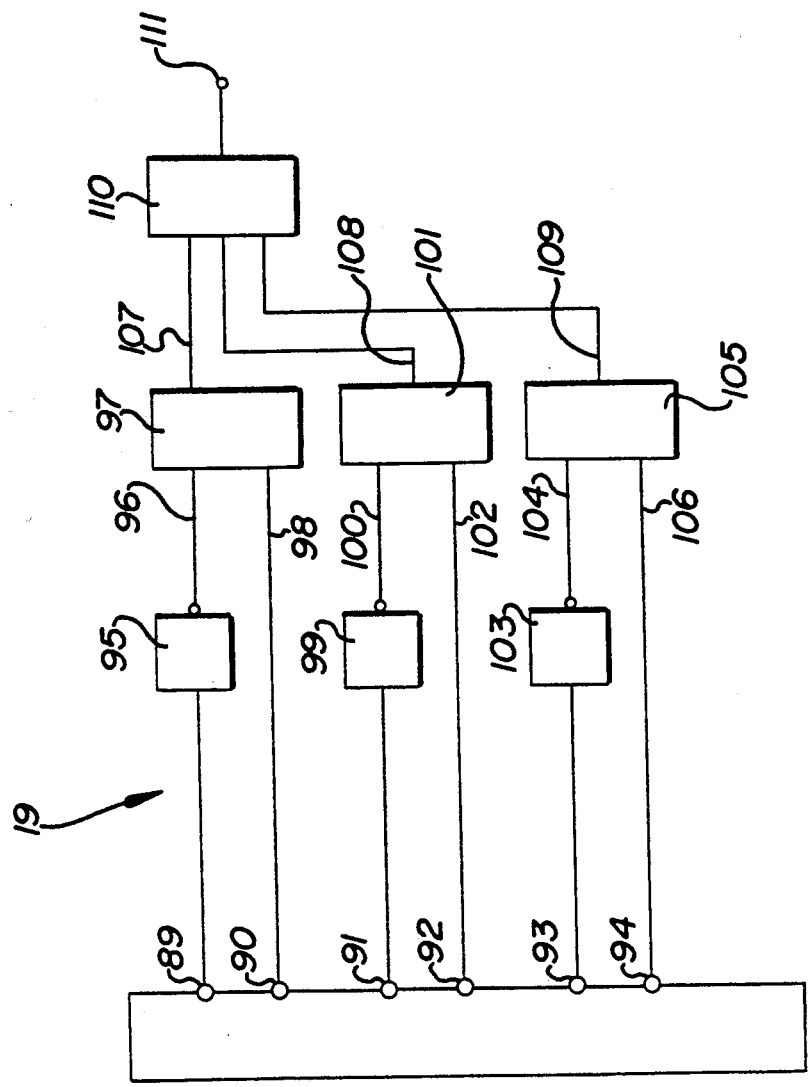
FIG. 6 is a block diagram of a device connectible to the evaluation circuit of FIG. 5 for generating a tacho-signal to determine the rotational speed of the rotor.

FIG. 6 shows a further device which is connected to the evaluation circuit 19. Terminals 89, 90, 91, 92, 93 and 94 are respectively linked to the connections 79, 82, 80, 83, 81 and 84 of FIG. 5 in the given order. The terminal 89 is connected via an inverter 95 to an input 96 of an AND element 97. The terminal 90 is connected to a second input 98 of the AND element 97. The terminal 91 leads via an inverter 99 to an input 100 of a further AND element 101, while a second connection 102 of the AND element 101 is connected to the terminal 92. The terminal 93 is connected via an inverter 103 to an input 104 of a third AND element 105, and the terminal 94 is connected to a second input 106 of the AND element 105. Outputs 107, 108 and 109 of the AND elements 97, 101 and 105, respectively, lead to three inputs, respectively, of an OR element 110. The OR element 110 has an output connection 111.

The foregoing circuit arrangement of the device of FIG. 6 produces a voltage according to the plot diagram 112 of FIG. 4 which is present at the output 111 of the OR element 110. Accordingly, a continual sequence of voltage pulses is formed from the third zones 34 of the signal tracks 14, 15 and 16. The greater the rotational speed of the rotor 2 of the electric motor 1, the greater is the sequence of pulses per unit time.

From all of the foregoing, it is apparent that the pulse sequences of the diagrams 40, 41 and 42 can be used as communication signals for the electric motor 1, which is preferably formed as a brushless direct-current motor. The sequence of pulses of the diagram 112 represents a tacho-signal $u_T$, which can be used with an appropriate conventional counting circuit for determining the rotational speed. Thus, the same sensors 26, 27 and 28 are used both for determining both the position and the rotational speed of the rotor 2.

We claim:

1. Device for determining the rotational speed and position of a rotor of an electric motor having three signal tracks arranged on the rotor, comprising three sensors located at a stator-side if the electric motor for scanning the signal tracks, and an evaluation circuit connected to said sensor, said sensor being sensitive to given stimuli of the signal tracks for alternatively adopting one of three different states which individually produce level of different magnitude; said evaluation circuit including detectors responsive in accordance with said levels, for cutting off levels of given magnitude so that a recognition of the rotor position is derivable from a first and a second one of the three states, and the rotational speed is derivable from the third one of said three states.

2. Device according to claim 1, wherein said detectors are electrical devices, and said levels are electrical voltage levels.

3. Device according to claim 1 wherein each of the signal tracks has light-reflecting zones of varying strengths, and each of said sensors is formed of a photoelectric component.

4. Device according to claim 3, wherein said signal-track zones include first zones having a very strong light reflectivity and light-absorbing second zones having minimum reflectivity, and third zones having light reflectivity of medium strength, said three states being producible by said first, second and third zones.

5. Device according to claim 4, wherein the zones for producing the third state are located within at least one of the other zones.

6. Device according to claim 4, wherein said third zones having light reflectivity of medium-strength are arranged within said light-absorbing second zones.

7. Device according to claim 4, wherein the zones associated with one of said states are formed of like-sized sections spaced equidistantly from one another in a row extending around the rotor.

8. Device according to claim 1, wherein each of the signal tracks has light-reflecting zones of varying strengths, and said sensors are formed of photoelectric components.

9. Device according to claim 7, wherein the zones formed of like-sized sections constitute said zones having light reflectivity of medium strength.

10. Device according to claim 4, including means responsive to said third zones for generating a tacho-signal formed of voltage pulses representing a measurement of the rotational speed of the rotor.

11. Device according to claim 4, including means responsive to said first zones for producing a maximum voltage to said second zones for producing a minimum voltage, and to said third zones for producing an intermediate voltage at said sensor.

12. Device according to claim 11, wherein said minimum voltage producible in response to said second zones is approximately 0 volts.

13. Device according to claim 4, wherein the electric motor has a given pole pitch, and wherein the zones for producing said first and second states from which the recognition of the rotor position is derivable are disposed in succession around the rotor in correspondence with the pole pitch of the electric motor.

14. Device according to claim 11, wherein said detectors have means for evaluating the voltage levels from a first threshold value located between said intermediate voltage and said maximum voltage, and a second threshold value lying between said minimum voltage and said intermediate voltage.

15. Device according to claim 15, including means for forming communication signals from the voltage pulses of the sensor which are greater than the first threshold value, and for forming tacho-signals from the voltage pulses of the sensor which are greater than the second threshold value but smaller than the first threshold value.

16. Device according to claim 1, wherein the rotor is formed with front and rear end faces, and wherein the signal track is disposed on one of said end faces.

17. Device according to claim 1 wherein the electric motor is a brushless direct-current motor.

* * * * *